May 16, 1939.  S. SCHNELL  2,158,804
AUTOMATIC BRAKE SHOE WEAR COMPENSATING MEANS
Filed May 16, 1938
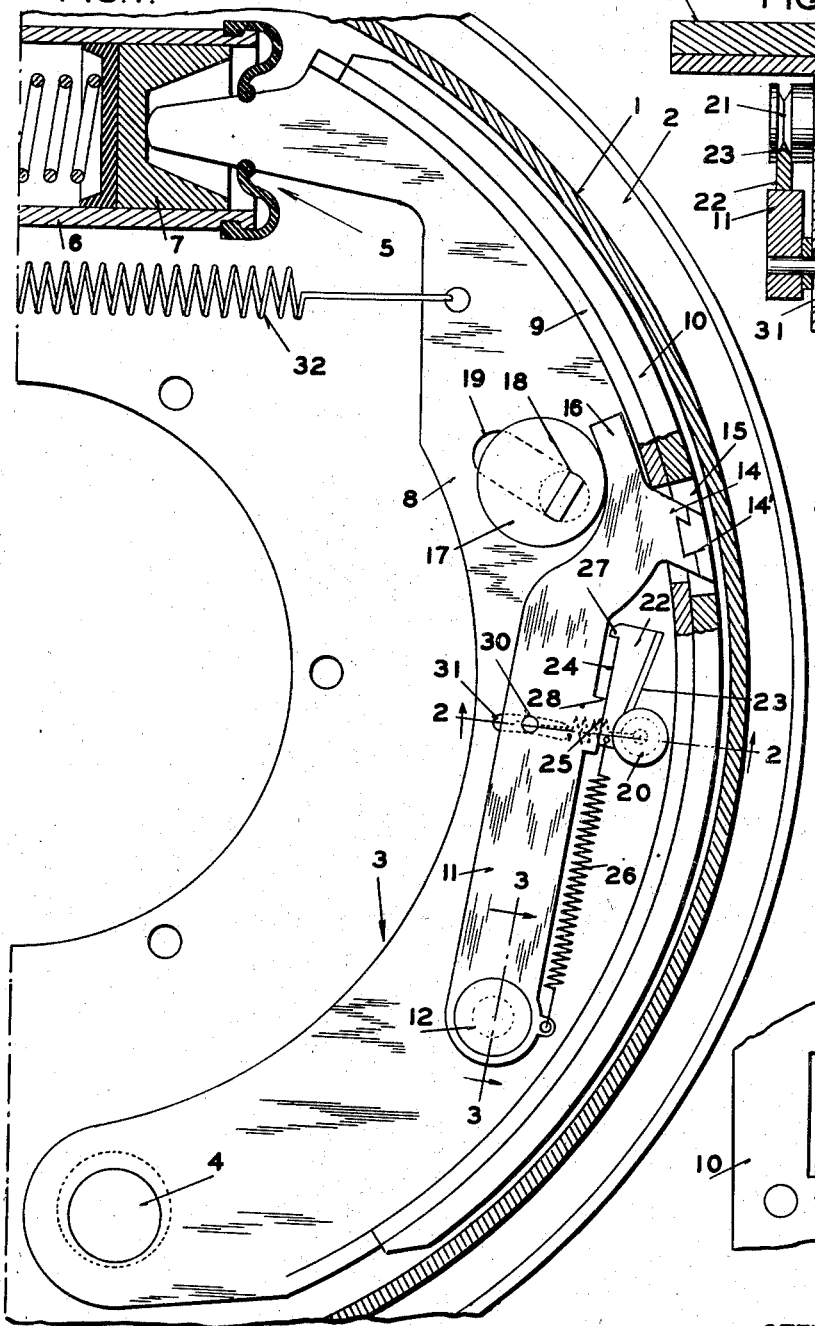
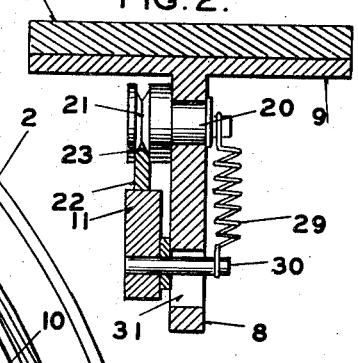
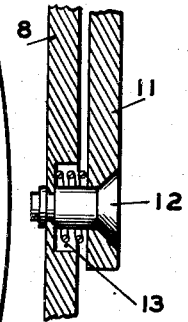
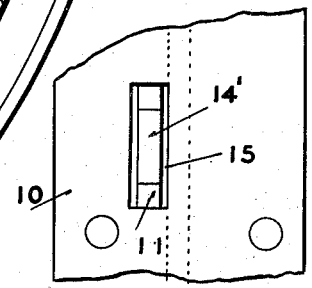
INVENTOR.
STEVE SCHNELL
BY
ATTORNEY.

Patented May 16, 1939

2,158,804

UNITED STATES PATENT OFFICE 2,158,804

AUTOMATIC BRAKE SHOE WEAR COMPENSATING MEANS

Steve Schnell, St. Louis, Mo., assignor to Wagner Electric Corporation, St. Louis, Mo., a corporation of Delaware Application May 16, 1938, Serial No. 208,115

4 Claims. (Cl. 188—79.5)

My invention relates to brakes and more particularly to means for compensating for the wear of the lining of the brake shoes.

One of the objects of my invention is to provide a brake with improved means for compensating for the wear of the lining of the brake shoe, which means is carried by the shoe and operated by engagement with the drum surface as the lining wears.

Another object of my invention is to provide an improved wear compensating means for the lining of a brake shoe whose adjustment is not affected by expansion and contraction of the drum as a result of braking action.

Still another object of my invention is to construct a simple and efficient wear compensating means for the lining of a brake shoe that can be incorporated in the brake at a minimum cost.

Other objects of my invention will become apparent from the following description taken in connection with the accompanying drawing in which Figure 1 is a side view, partly in section, of a portion of a brake assembly having associated therewith one form of my wear compensating means for the lining of the brake shoe; Figures 2 and 3 are cross-sectional views taken on the lines 2—2 and 3—3, respectively, of Figure 1; and Figure 4 is a view showing how the operating member projects through the lining and the lining carrying portion of the shoe.

Referring to the drawing in detail, the numeral 1 indicates the usual brake drum and 2 the backing plate or support associated therewith and secured to some fixed part of the vehicle. Within the drum is a brake shoe 3 pivoted at its lower or heel end to the backing plate by means of an adjustable eccentric anchor pin 4. The upper or toe end of the shoe is shown as being actuated by a fluid motor 5 comprising a cylinder 6 and a piston 7. The fluid motor is of the double-piston type, only one piston being shown, the other being employed to actuate the other brake shoe which is a substantial duplicate of shoe 3. The brake shoe 3 comprises a web portion 8 and a lining carrying flange 9 upon which is secured the lining 10.

In accordance with my invention, a lever 11 is pivotally mounted upon one side of web 8 of the shoe by means of a pivot pin 12 and interposed between this lever and the web at the pivot pin is a spring 13 for holding the lever in frictional engagement with the conical surface of the head of the pin. The free end of lever 11 is formed with an extension 14 which extends through an opening 15 in the lining carrying flange and the lining of the brake shoe and carries relatively long wearing material 14' for engagement with the drum when the shoe is actuated. There is also provided on the free end of the lever, a second extension 16 for cooperation with a stop in the form of a cam 17 eccentrically secured to the end of a pin 18 extending through a hole 19 in the shoe web and secured to the backing plate 2.

A pin 20 formed with a V-shaped groove 21 is carried by web 8 between the central portion of lever 11 and the lining carrying flange 9. A wedge 22 has a V-shaped edge 23 cooperating with the groove and an opposite edge 24 cooperating with the surface 25 on the central portion of the lever. This wedge is adapted to be moved relative to pin 20 and the lever by means of a spring 26 connected at one end of the wedge and at the other end to the lever adjacent pivot pin 12. The wedge is formed with a shoulder 27 for cooperation with a shoulder 28 on the lever to limit the movement of the wedge by spring 26 relative to the lever. The wedge is held in engagement with lever 11 and pin 20 by means of a spring 29 positioned on the side of the web opposite that of the lever, this spring also forcing the V-shaped edge 23 tightly into the V-shaped groove 21. One end of the spring is secured to a projection on the end of pin 20 and the other end is secured to a pin 30 carried by lever 11 and extending through an opening 31 in the web.

In making the initial adjustments the heel of the brake shoe is first properly adjusted with respect to the drum by means of the adjustable pin 4. Next, the fluid motor 5 is operated to bring the lining into engagement with the drum and then wedge 22 is pulled up and lever 11 moved with respect to the web so the material 14' on projection 14 engages the inner surface of the drum. The cam 17 is now adjusted with respect to the projecting portion 16 of the lever so the clearance between the lever and cam 17 is equal to the clearance desired between the lining and the drum when the shoe is in its "off" position. The adjusting mechanism is now so set that no further manual adjustments are required throughout the life of the lining. The retracting spring 32 holds the shoe in the normal "off" position.

The material 14' on projection 14 of the lever is preferably some material which is harder or has longer wearing characteristics than the shoe lining 10 so that it will not wear as rapidly as the lining. This material, however, would wear less rapidly than the lining notwithstanding it was the same as the lining since the pressure with which it engages the drum is determined by spring 29 which is less than the pressure which the lining engages the drum when the shoe is actuated by the fluid motor. As the lining wears, projection 14 on lever 11 will be pushed back, thus causing the lever to move in a counterclockwise direction about its pivot pin 12. This movement of the lever away from pin 20 creates a greater space between the two elements which permits wedge 22, under the action of spring 26, to move downward and maintain the lever in its new position. The spring 29 between lever 11 and pin 20 is of such strength that spring 26 cannot operate the wedge to move the lever away from pin 20. Also the action of spring 29 is maintaining the V-shaped edge 23 in tight engagement with the V-shaped groove 21 and adds additional resistance to the movement of the wedge. The only time that the wedge can be operated is when the lever is moved as a result of engagement with the drum as the lining wears. It is thus seen that as the lining wears, the lever will be moved to compensate for this wear and the wedge will be operated to maintain the lever in its new position with respect to the shoe. The set space between the fixed cam 17 on the backing plate and the surface of the lining which engages the drum is always maintained constant when the shoe is returned to its retracted position.

The expansion and contraction of the drum during braking action does not in any way affect the automatic adjusting means. When the drum expands, the shoe and the entire adjusting mechanism carried thereby will move out with the drum and there will be no movement of the wedge as lever 11 is not moved. It is only when the lining wears and the drum is capable of engaging and moving the lever relative to the shoe web that any adjustment takes place and this amount of adjustment will be equal to the amount of lining wear.

Since the material 14' on projection 14 is subject to some wear, provision is made to compensate for this so that the difference between stop 17 and the surface of the lining when the shoe is retracted is always substantially constant throughout the life of the lining. This is accomplished by having cam 17 so positioned that it is engaged by a portion of the lever which is at a greater distance from the lever pivot than the portion of the lever which carries the material 14' for engaging the drum. Thus for a given movement of projection 14, there will be a greater movement of the portion of the lever which contacts the cam. The amount of greater movement should be such as to be the same as the amount of wear of material 14' during the given movement of projection 14. The greater the wear of material 14' the farther the cam should be positioned from the pivot of the lever.

The shoulders 27 and 28 on the wedge and the lever are so related to each other and the thickness of the lining that they will contact when the lining is substantially worn out. Thereafter the automatic compensation will cease and the operator will be warned that the lining needs replacing as the brake pedal will begin to approach the floor boards since the "off" position clearance of the shoe will increase and thus require greater pedal movement to engage the shoe with the drum.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus, a support, a brake drum, a brake shoe provided with lining for cooperation with the drum, means for actuating the brake shoe, a member pivoted to the shoe and having a portion adapted to engage the drum only when the shoe is actuated to engage the lining with the drum, said portion having a less rate of wear than the lining whereby the member will be moved as the lining wears, an adjustable stop fixed to the support and adapted to be engaged by the pivoted member when the shoe and lining is moved away from the drum, a sliding wedge cooperating with the pivoted member and the shoe, and spring means for moving said wedge in order to maintain the pivoted member in the position it assumes as a result of its movement as the lining wears to thereby maintain the surface of the lining which cooperates with the drum a predetermined distance from the center of the drum.

2. In braking apparatus, a support, a brake drum, a brake shoe adapted to cooperate with the drum, a fixed stop carried by the support, a member pivoted on the shoe and adapted to engage the stop when the shoe is moved away from the drum, means controlled by the wear of the shoe for causing relative movement between the shoe and pivoted member, means cooperating with the shoe and pivoted member and comprising a sliding wedge for automatically maintaining the pivoted member and the shoe in their relatively adjusted positions so that the surface of the shoe which cooperates with the drum will at all times be a predetermined distance from the stop when the pivoted member is in engagement with the stop, and cooperating stop means on the wedge and the pivoted member for limiting the extent of movement of the wedge.

3. In braking apparatus, a support, a brake drum, a brake shoe adapted to cooperate with the drum, a fixed stop carried by the support, a member pivoted on the shoe and adapted to engage the stop when the shoe is a predetermined distance from the drum, means controlled by the wear of the shoe for causing relative movement between the shoe and pivoted member, and means cooperating with the shoe and pivoted member for automatically maintaining the pivoted member and the shoe in their relatively adjusted positions so that the surface of the shoe which cooperates with the drum will at all times be at a predetermined distance from the stop when the pivoted member is in engagement with the stop, said means comprising a sliding wedge cooperating with surfaces on the shoe and pivoted member, a spring for maintaining said wedge in adjusted position, and a spring for moving said wedge as the shoe and pivoted member move relatively.

4. In braking apparatus, a support, a brake drum, a brake shoe adapted to cooperate with the drum, a fixed stop carried by the support, a member pivoted on the shoe and adapted to engage the stop when the shoe is a predetermined distance from the drum, means controlled by the wear of the shoe for causing relative movement between the shoe and pivoted member, a member carried by the shoe and provided with a V-shaped groove, a sliding wedge having a V-shaped edge cooperating with said member and another surface cooperating with the pivoted member, a spring for forcing the pivoted member into engagement with the wedge and the wedge into engagement with the member on the shoe, and a spring for moving the wedge relative to the pivoted member when said member and shoe have relative movement as the shoe wears.

STEVE SCHNELL.